June 5, 1928.  1,672,141
A. F. K. YGGER
RECORDING MECHANISM FOR WEIGHING SCALES
Filed June 9, 1925   6 Sheets-Sheet 1
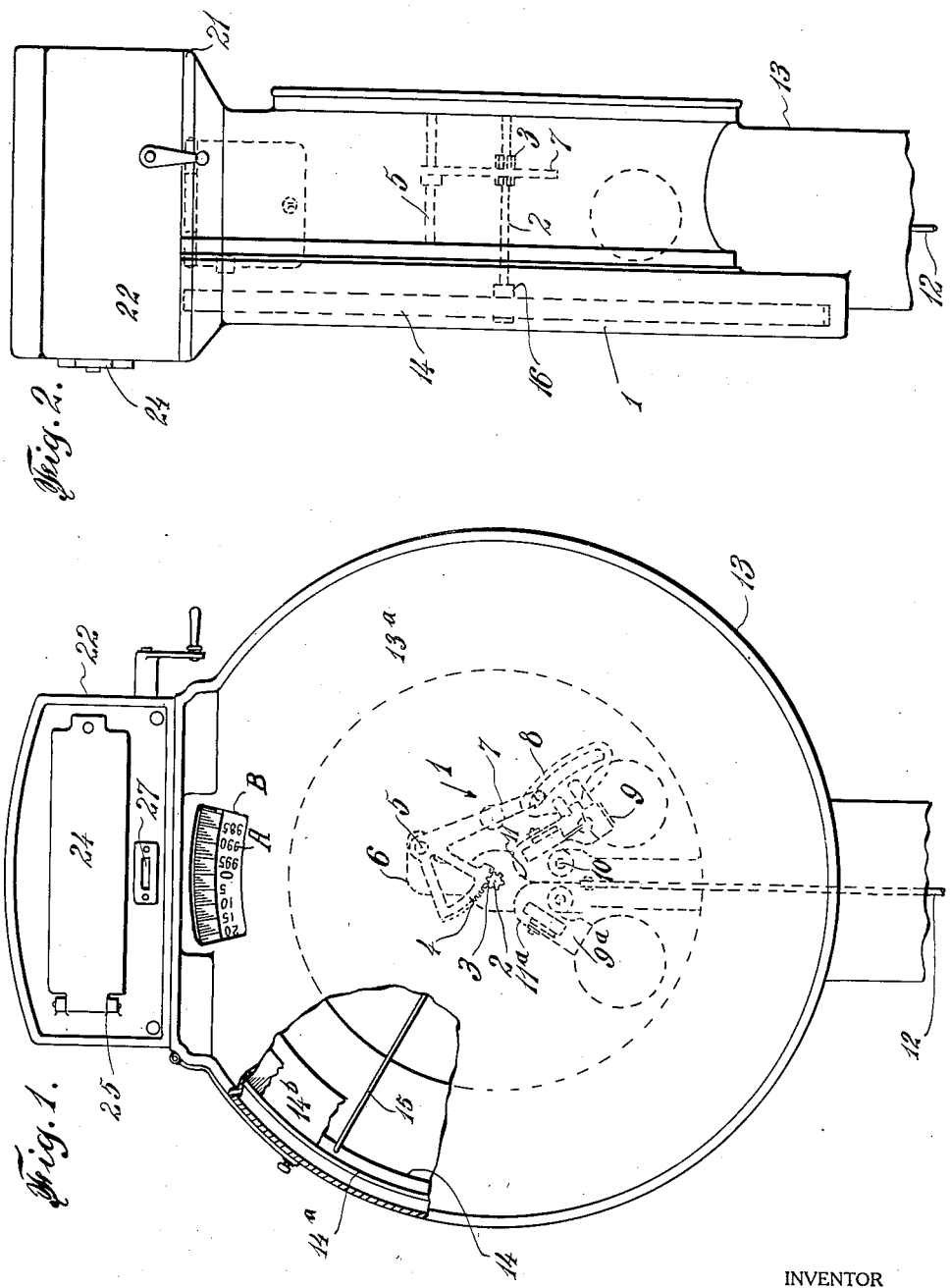
INVENTOR
A. F. K. Ygger
BY
T. F. Bourne
ATTORNEY

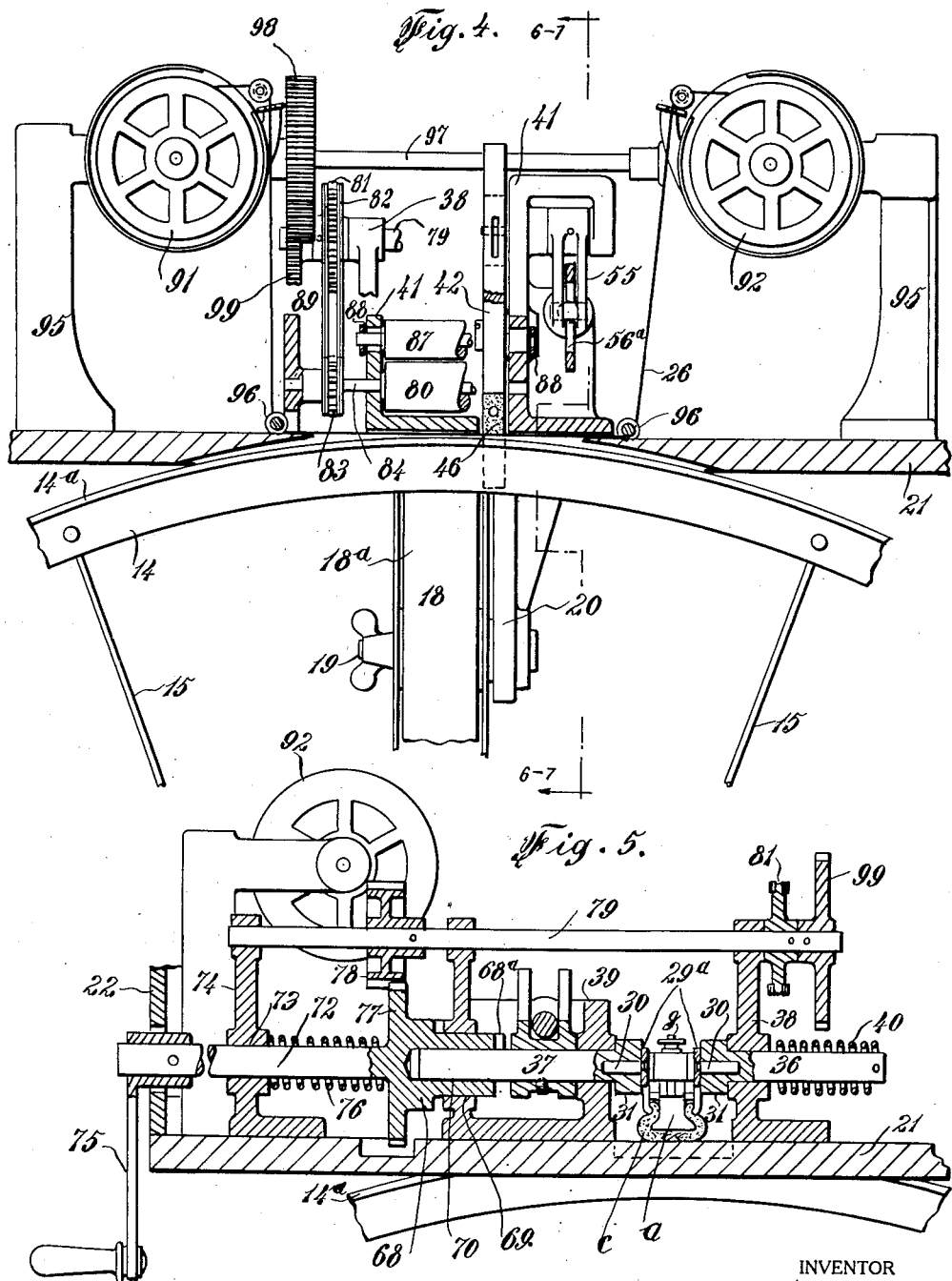

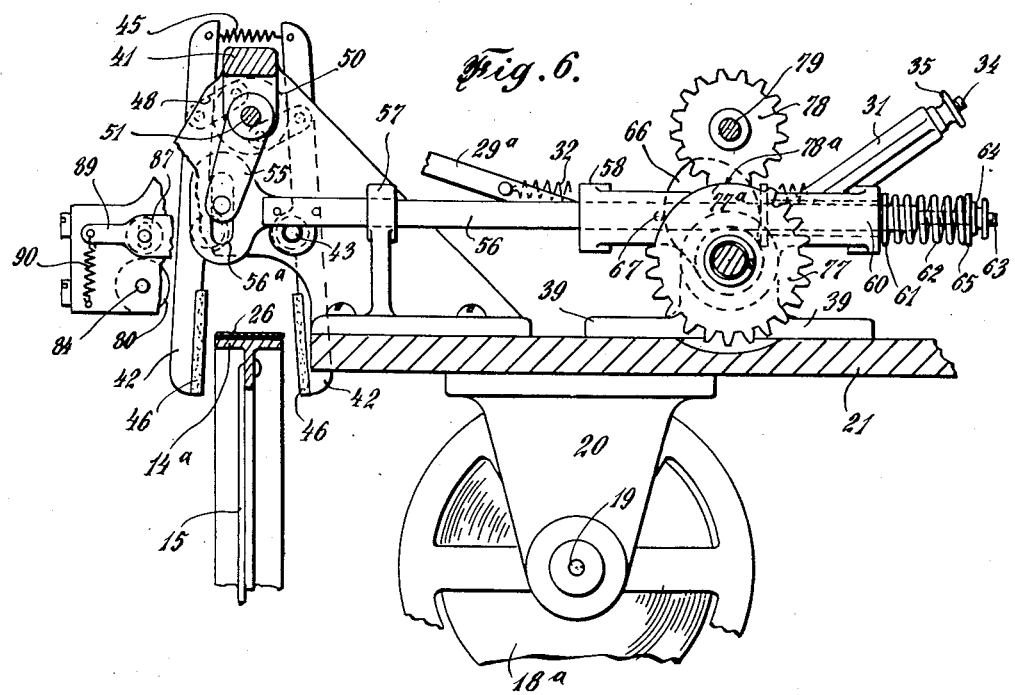

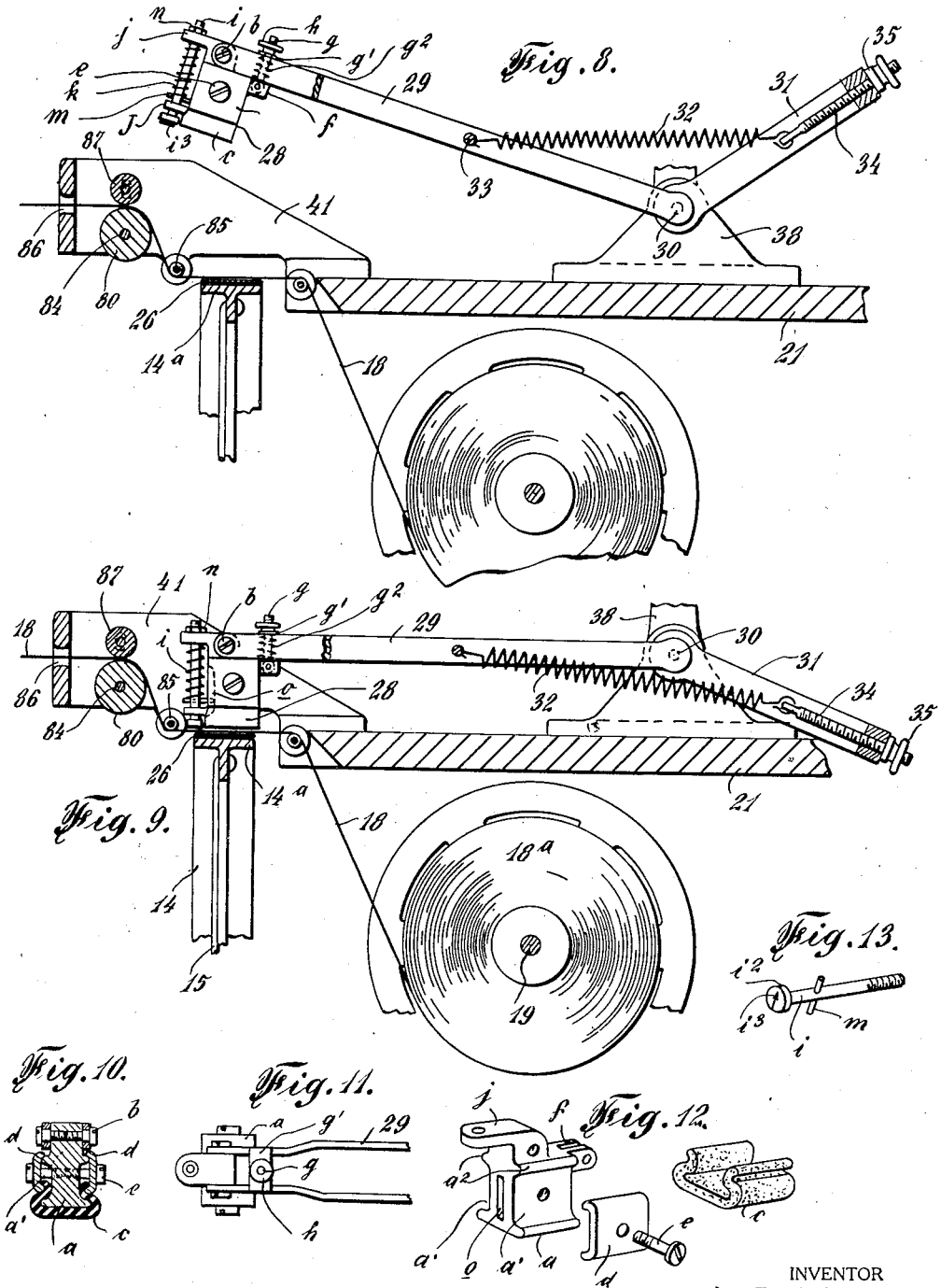

June 5, 1928.
A. F. K. YGGER
1,672,141
RECORDING MECHANISM FOR WEIGHING SCALES
Filed June 9, 1925 6 Sheets-Sheet 6
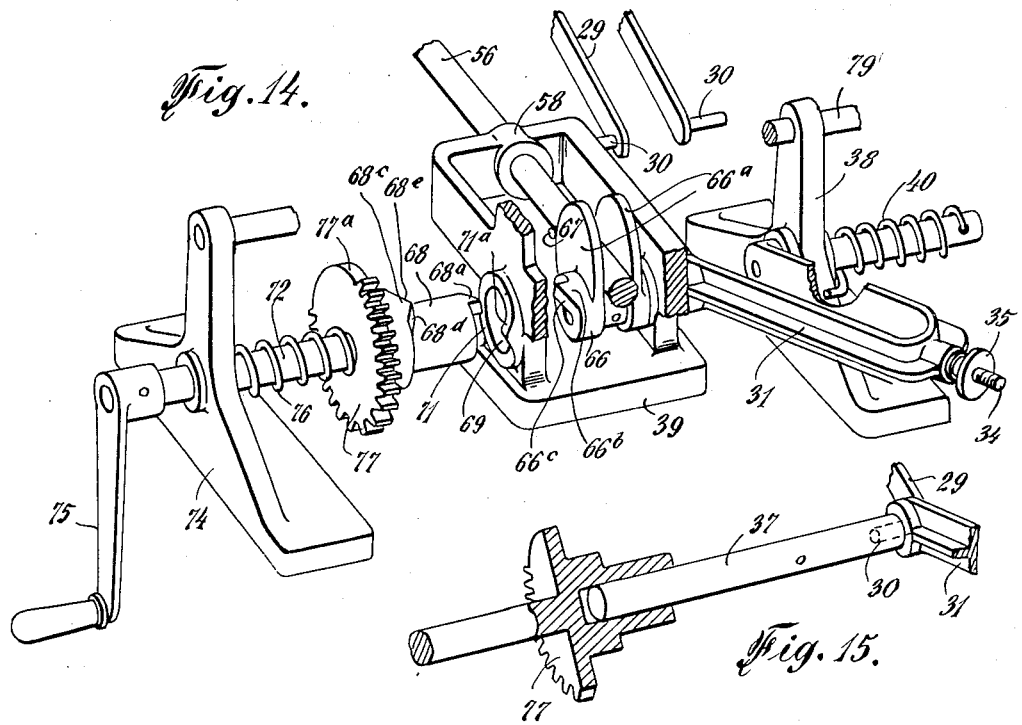
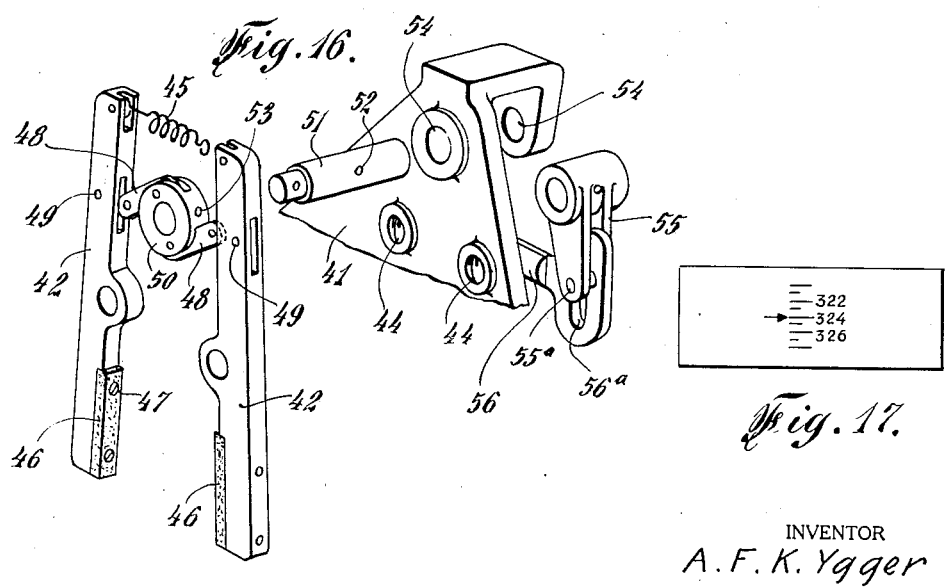
INVENTOR
A.F.K. Ygger
BY T. F. Bourne
ATTORNEY Patented June 5, 1928.

1,672,141

UNITED STATES PATENT OFFICE.

ALBERT FRITJOF KARLSSON YGGER, OF NEW YORK, N. Y., ASSIGNOR TO AMERICAN KRON SCALE CO., OF NEW YORK, N. Y., A CORPORATION OF NEW YORK.

RECORDING MECHANISM FOR WEIGHING SCALES.

Application filed June 9, 1925. Serial No. 35,953.

This invention relates to improvements in the class of weighing scales that are provided with means for recording or printing upon strips or tickets the weight of articles being weighed. An object of the invention is to provide a weighing scale with a type wheel adapted to be rotated by the scale mechanism in accordance with the weight of an article being weighed, said type wheel preferably having numerals in position to indicate the weight of an article, means under the control of the operator to hold the type wheel rigidly in position set by the weight of said article, a hammer to impress a strip of paper, ticket or the like against the type for printing the weight on the strip or ticket, means to automatically operate and restore the hammer and release the type wheel, and means to automatically feed the strip or ticket in position to be cut off for use, means also being provided, as in the form of an inking ribbon, for printing the type upon the ticket or strip.

This invention also comprises novel details of improvement that will be more fully hereinafter set forth and then pointed out in the claims.

Reference is to be had to the accompanying drawings forming a part hereof, wherein Fig. 1 is a partly broken front elevation of a portion of a weighing scale equipped with improved recording mechanism;

Fig. 2 is a side view of Fig. 1;

Fig. 4 is a vertical section on line 4, 4, in Fig. 3;

Fig. 5 is a section on line 5, 5, in Fig. 3;

Figs. 6 and 7 are sections substantially on line 6—7, 6—7, in Fig. 4, showing parts in different positions;

Figs. 8 and 9 are sections substantially on line 8—9, 8—9, in Fig. 3, illustrating the parts in different positions;

Fig. 10 is a sectional detail of the hammer;

Fig. 11 is a detail plan view of the hammer;

Fig. 12 is a perspective view illustrating detached parts of the hammer;

Fig. 13 is a perspective detail of a printing type to indicate the weight numeral on the strip or ticket;

Fig. 14 is a partly sectional perspective view illustrating parts for actuating the type wheel gripper and the hammer shown in disassembled relation;

Fig. 15 is a sectional detail of parts of Fig. 14;

Fig. 16 is a perspective detail illustrating type wheel gripping parts in disassembled relation; and Fig. 17 is a detail illustrating a printed ticket.

Similar characters of reference indicate corresponding parts in the several views.

Figure 3:
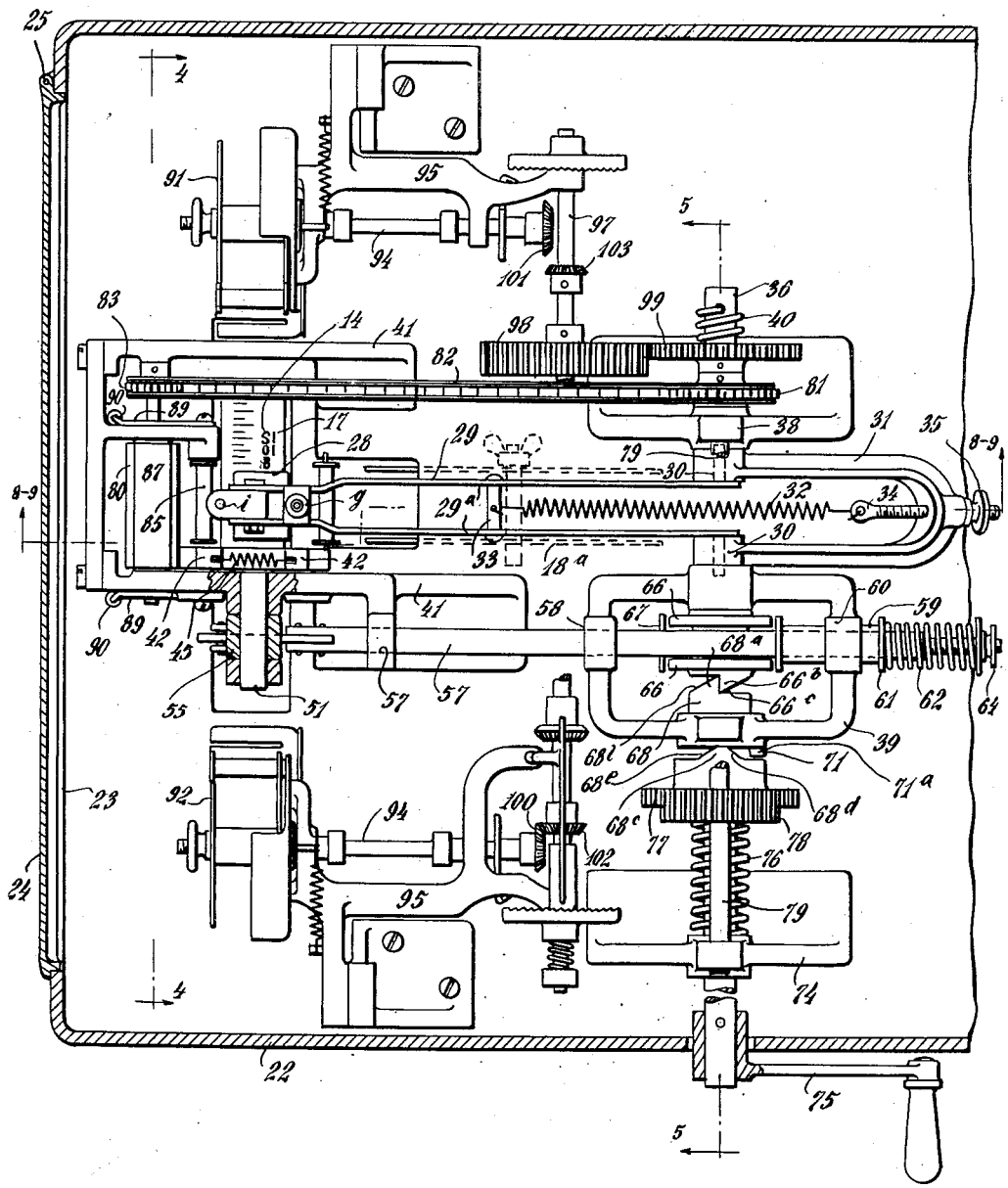
Fig. 3 is an enlarged plan view of the recording devices.

The numeral 1 indicates a weighing mechanism which may be of any desired construction. In the example illustrated in Figs. 1 and 2 the weighing mechanism is of a well known character and of the class known in the trade as the Kron scale, comprising an indicator shaft 2 having a pinion 3 in mesh with a rack 4 pivoted at 5 upon a support 6. The rack has an arm 7 cooperative with a slotted actuating member 8 that is carried by a weighted lever 9 pivoted on the support at 10 and connected by a flexible strip 11 with a pull rod 12 that is to be connected with any suitable weighing platform, scale pan or the like, (not shown), to receive articles to be weighed. There may be a second weighted lever 9ª connected by a strip 11ª with the pull rod 12. The mechanism described is preferably enclosed within a suitable casing 13 supported in any well known way. Upon shaft 2 is secured a balanced type wheel or support 14 shown comprising an annular rim 14ª supported by spokes 15 extending from a hub 16 secured to shaft 2 and rotated within casing 13 by the weighing mechanism. The peripheral surface of rim 14ª is provided with spaced numerals in suitable consecutive order, indicated at 17, (Fig. 3), to be printed upon a strip of paper or the like 18, which may be supplied upon a spool at 18ª supported upon a spindle 19 suitably supported by bracket 20 carried by supporting base or plate 21 of the recording mechanism (Figs. 6 to 9.) Upon the front side of type wheel 14 is located a weight-indicator, shown in the form of an edgewise-disposed band 14$^b$ carrying suitable indicating numerals A adapted to show through an opening B in the front wall 13$^a$ of casing 13, (Fig. 1), to indicate visually the weight of an article being weighed when type wheel 14 is rotated by the scale mechanism. It will be understood that the indicating parts A and B are in the nature of a scale dial.

The base or plate 21 is supported upon casing 13, as indicated in Figs. 1 and 2, and preferably carries a protecting casing or housing 22 within which the recording mechanism is enclosed, (Figs. 1 to 3). The casing or housing 22 is shown provided with a front opening 23 closed by a door 24 pivoted on the casing at 25 to permit access to the recording mechanism, and to permit replacement of spools of paper strip 18, as well as an inking ribbon 26 that is supported to overlie the type rim 14$^a$ beneath the strip 18, (Figs. 4, 8 and 9). In the front wall of casing 22 is a slot 27 through which the printed strip 18 will be fed to be torn off for use. The edges of slot 27 may be utilized as a cutter for severing the strip by pulling the latter against such edge.

At 28 is a hammer or impresser operative over the type wheel, corresponding to the zero position thereof, and over the location where the strip 18 crosses over the inking ribbon 26, for causing type of the wheel 14 to be printed upon the strip in accordance with the position of the type wheel as rotated by the scale mechanism due to the weight of an article being weighed. The hammer 28 is carried by a rockable arm 29 which is shown comprising two spaced members 29$^a$ having laterally disposed pivot pins 30 that are journaled in bearings in a forked arm 31, (Figs. 3 and 5), whereby the arms 29 and 31 may have independent rocking movement on a common axis. A coiled spring 32 is connected at its ends with the arms 29 and 31, being shown attached at one end to a pin 33 located between and secured to the arms 29$^a$ and to an adjusting screw 34 carried by the outer closed end of arm 31, whereby said spring may be operative in the space within said arms, and will normally retain the arms in angular relation. The screw 34 is slidable in a bore in said end of arm 31 and a nut 35 on said screw bears against said arm, whereby the screw may be adjusted longitudinally to regulate the tension of spring 32. The arrangement is such that when arm 31 is in the normal raised position, (Fig. 8), the spring 32, (being above pivots 30), will cause arm 29 and hammer 28 to be correspondingly raised from the printing position, and when arm 31 is depressed so that spring 32 is carried down below the plane of the pivots 30 said spring will cause arm 29 and hammer 28 to be automatically suddenly and elastically depressed, whereby the hammer will strike strip 18 over the type wheel to cause printing of type on said strip by means of the ribbon 26, (Fig. 9). When arm 31 is next raised and elevates spring 32 the tension of the latter, after the spring passes above the plane of the pivots 30, will cause the arm 29 and the hammer to be raised, the hammer being quickly and automatically raised from the strip 18 and the printing position. The inner ends of the members of arm 31 are respectively provided with laterally disposed shafts 36 and 37, extending in opposite directions, (Fig. 5), the shaft 36 being journaled in a bracket 38 on base 21 and shaft 37 being journaled in a bracket 39 on said base. A coil spring 40 on the projecting end of shaft 36 is attached at one end to said shaft and at its opposite end cooperates with bracket 38, (Fig. 14), in such a way as to normally return the arm 31 from the depressed or printing position, (Fig. 9), to the normal non-printing position, (Figs. 6, 8 and 14).

The hammer comprises a head $a$ against the upper sides of which the spaced arms 29 are located and pivoted by screw or bolt $b$ passing through said parts. At $c$ is a relatively soft pad of rubber, felt or the like, located at the bottom of the head, and the edges of the pad are shown received in recesses $a'$ in the sides of the head and retained by plates $d$ that bear against the edges of the pad and against ribs $a^2$ on the head, a screw or bolt $e$ passing through said plates and the head serving to detachably secure the parts together, (Figs. 10, 11, 12). To provide for adjusting the pad with relation to the plane of the type wheel the head $a$ may swing on the bolt or screw $b$ and is provided with an extension $f$ pivotally receiving a threaded rod or screw $g$ having a nut $h$ operable against a stop or plate $g'$ secured on the arm 29 for adjusting the head. A spring $g^2$ between extension $f$ and stop or plate $g'$ resiliently resists impact of the hammer. In order to show on the printed ticket the exact numeral intended to indicate the weight of the article being weighed, (since numerals on opposite sides of the intended numeral may also be printed on the ticket), the hammer is provided with a spring-pressed type member $i$ shown in the form of a pin, having a head $i^2$ on the under surface of which an indicator type $i^3$ is located, (Figs. 8, 9 and 13), to be stamped upon the strip for causing the ribbon to impress the indicator on the strip. The pin $i$ is guided in bearings $j$ projecting from the head and a coil spring $k$ around the pin bears against the upper bearing $j$ and against a projection $m$ on pin $i$ normally forcing the pin downwardly. The threaded end of pin $i$ is retained and may be adjusted by means of a nut $n$ opposing the adjacent bearing *j*. The nut *n* retains type *i*³ in printing position and pin *k* permits a resilient stroke of the type against strip 18. The projection *m* is slidable in a slot or groove *o* in head *a* to keep pin *i* from rotating so that the type *i*³ will be retained in proper printing position.

It is intended, after the type wheel 14 comes to rest in accordance with the weight of an article being weighed and just before the hammer strikes the printing stroke, that the type wheel will be gripped and rigidly held, and after the hammer has receded from the printing position the type wheel will be released. At 41 is a bracket secured to base or plate 21 adjacent to the printing position, (Fig. 4), upon which bracket a pair of grippers 42 are pivoted in spaced relation with their lower free ends located on opposite sides of rim 14ª of the type wheel in position to grip said rim, (Figs. 4, 6, 7 and 16). The grippers 42 are journaled upon pivot pins 43 that are secured in holes 44 in bracket 41, (Fig. 16), and the upper ends of said grippers are interconnected by a spring 45 tending normally to draw the adjacent ends of the grippers together to spread the lower operative ends from the type wheel rim, (Fig. 6). The lower ends of the grippers are preferably provided with pads 46, which may be made of leather, rubber or the like, detachably connected to the grippers by means of screws 47, whereby said pads will grip the type-wheel rim more or less resiliently. To positively operate the grippers 42 for gripping the type-wheel rim links 48 are pivotally attached to the grippers above their pivotal points, as by means of pins at 49, which links are also pivotally attached to diametrically opposite points of a disk or member 50 located between the upper ends of the grippers and secured to a shaft 51 by means of a pin passing through holes 52, 53, the shaft being journaled in bearings at 54 on bracket 41, (Fig. 16). An arm 55 is secured to shaft 51 and is operatively connected with a rod 56, whereby said arm may be rocked, for which purpose arm 55 is shown provided with a pin 55ª operative in slot 56ª at the adjacent end of rod 56. The rod 56 is slidable in a bearing 57 in bracket 41 and in a bearing 58 in bracket 39, (Figs. 3 and 7). Upon rod 56 is a sleeve 59 slidable in a bearing 60 in bracket 39. A disk or washer 61 is slidable on rod 56 and abuts the adjacent end of sleeve 59, a spring 62 encircling the end of rod 56 and bearing against said disk or washer, (Figs. 3 and 7). The end of rod 56 is provided with screw threads at 63 having a nut 64 against which the adjacent end of spring 62 presses, preferably against an interposed washer 65, whereby sleeve 59 is resiliently opposed. By means of nut 64 the tension of spring 62 against the end of sleeve 59 is adjusted. A cam 66 is operative against the inner end of sleeve 59 against the tension of spring 62. The cam is shown having two spaced members 66ª, (Fig. 14), between which rod 56 is slidable. The cam 66, on its side opposite sleeve 59, is operative against a pin 67 projecting from rod 56, (Fig. 3). When the parts are in operative or normal position the cam 66 will be in the position shown in Fig. 6, whereby rod 56 will have been moved to the left in said figure causing arm 55 to rotate shaft 51, whereby the links 48 will have caused the grippers to spread at the lower part to release the type-wheel 14,— the spring 62 causing the sleeve 59 to follow the cam and remain in contact therewith. When cam 66 is rotated clockwise toward the right, (Fig. 7), it will push sleeve 59 and thereby through spring 62 and nut 64 rod 56 will be moved to the right to correspondingly rotate arm 55, which, through the medium of links 48, will cause the lower ends of grippers 42 to approach and grip the type-wheel rim to retain it firmly in position for printing upon strip 18 the type representing the weight of the article being weighed. The arrangement is such that the grippers will grip the type-wheel before the limit of the rotary stroke of cam 66 to the right in Fig. 7, and continued movement of the cam will cause sleeve 59 to slide and compress spring 62 so that the grippers will continue to grip the type-wheel through resilient action of the spring. On the return stroke of the cam it will engage pin 67 and push rod 56 to the left in Fig. 6, causing the grippers to spread and release the type wheel, the spring 62 causing sleeve 59 to follow the cam. When cam 66 is rotated to the right in Fig. 6 it will correspondingly rotate shaft 37 and arm 31 to depress the latter to cause printing operation of the hammer, and upon the release of the cam the spring 40 will operate to cause arm 31 to rise, whereby arm 21 and the hammer will rise from printing position and the spring will cause cam 66 to push rod 56 and thereby the grippers 42 will be spread and release the type-wheel, restoring the parts to normal position.

One of the features of the invention is that arm 31 and cam 66 will be operated from the normal position, (Fig. 6), to the operative position, (Fig. 7), for gripping the type-wheel and printing on strip 18, and will be released for automatic return of the hammer and the grippers to normal position. The foregoing is accomplished by manually rotating an operating member or the crank. A further feature is that continued rotation of said operating member, after release of arm 31 and cam 66, will cause operation of devices to feed strip 18 and the inking roll 26. Cam 66 is provided on one side with a stop or projection 66$^b$, having an angularly disposed or cam-like outer surface 66$^c$ receding in the direction of the cam, (Figs. 3 and 14), which projection is adapted to be engaged by a projection 68$^a$ of an actuating member 68 adapted to engage the projections 66$^b$ for rotating the cam. Projection 68$^a$ has a receding surface 68$^b$, (Fig. 3), adapted to cooperate with or slide along the face 66$^c$ of projection 66$^b$. The member 68 is operative in a bearing 69 in bracket 39 and said member has a bore 70 receiving shaft 37, whereby member 68 may slide. Bracket 39 is provided with a projection 71 on one side having an inclined or cam-like face 71$^a$ to be engaged by a complemental projection 68$^c$ on member 68. The projection 68$^c$ is provided with oppositely inclined faces 68$^d$, 68$^e$, (Fig. 3). In the normal position of the parts, when projections 66$^b$ and 68$^a$ cooperate, (as in Fig. 3), projection 68$^c$ will be at one side of projection 71, and when member 68 is rotated clockwise to the right in Fig. 3 the projection 68$^c$ will ride on projection 71 to slide the member 68 and withdraw projection 68$^a$ from projection 66$^b$ to release cam 66 for automatic return to its normal position. The location of the high part of projection 71 with respect to the normal position of projection 68 may be substantially at an angle of 45° thereto so that when member 68 has been given a quarter turn the separation of the projections 66$^b$ and 68$^a$ will release cam 66, and during continued rotation of said member for a complete rotation the operations of feeding the strip 18 and the inking ribbon will occur. The member 68 is provided with a shaft 72 slidable in a bearing 73 in a bracket 74 secured upon base or plate 21, which shaft is provided with an operating member or crank 75, (Figs. 5 and 14). A spring 76, interposed between member 68 and bracket 74, serves normally to keep member 68 pushed to the right in Fig. 5 for engagement of the projections 66$^b$ and 68$^a$ in their normal positions of rest.

The member 68 is provided with a gear 77 cooperative with a wider gear 78 that is secured upon a shaft 79 shown journaled in bearings in the brackets 38, 39 and 74. The width of gear 78 is such that gear 77 will remain in mesh therewith during sliding of gear 77 with member 68. The width of the gears may be reversed. The gears 77 and 78 are what is commonly called mutilated gears, that is to say, the teeth of gear 77 extend partially around the same and the gear is provided with a circular surface 77$^a$ adapted to engage a corresponding surface 78$^a$ on gear 78, whereby in the normal position of the parts and during about the first quarter rotation of gear 77 with member 68 the gear 78 and shaft 79 will remain unrotated, during the time that the projection 68$^a$ of member 68 is rotating the cam 66, during the printing operation. When the printing operation has ceased and the hammer has retreated from strip 18 the teeth of gears 77 and 78 will mesh for rotating shaft 79, for the following three-quarters rotation of the gears, whereupon said teeth will release and the smooth surfaces 77$^a$, 78$^a$ will re-engage, and so on for each complete rotation of operating member or crank 75.

Shaft 79 is utilized to operate a feed roll 80 for ticket strip 18, for which purpose shaft 79 is shown provided with a sprocket wheel 81 receiving chain 82 which operates sprocket wheel 83 on shaft 84 of said roll, (Figs. 3, 4 and 7). Shaft 83 is journaled on members of bracket 41 with roll 80 located in position to receive the printed portion of strip 18 that passes from the type-wheel 14 under an idle guide roll 85 and over the roll 80 through a slot 86 in the front wall of bracket 41, (Figs. 8 and 9). A pressure roll 87, complemental to roll 80, lies over the latter to engage strip 18 with suitable pressure for feeding the latter by and during rotation of roll 80. The ends of the shaft of pressure roll 87 are operative in slots 88 in members of bracket 41, which shaft is journaled in holes in arms 89 journaled upon the members of bracket 41, springs at 90 connecting said arms to bracket 41 serving to retain roll 87 against strip 18 with resilient pressure. After the hammer has caused printing of type-wheel 14 upon strip 18 and the hammer has been released from the strip, continued rotation of member 75 will cause operation of roll 80 to feed the printed strip through slot 27 of casing 22 in position to be torn off.

Any suitable means may be provided for supporting and operating the inking ribbon 26, which may be moved while strip 18 is fed each time after printing. At 91, 92 are spools for ribbon 26. The shafts 93, 94 for the ribbon spools are journaled upon brackets 95 spaced apart and secured upon base or plate 21 in such position that the ribbon 26 may pass between the spools under idle rolls 96 journaled upon base 21, (Figs. 3 and 4). A shaft 97 is journaled upon the brackets 95 and is provided with a gear 98 in mesh with a gear 99 secured upon shaft 79, (Figs. 3, 5 and 7), whereby each time the shaft 79 is rotated, as before described, the shaft 97 will be rotated for operating one or the other of the ribbon spools. The ribbon spool operating devices illustrated are well known in the art and are similar to those used on typewriting machines for feeding inking ribbons, comprising gears 100, 101 on shafts 94 adapted to be alternately engaged by gears 102, 103 on shaft 97 for operating the ribbon in opposite directions.

The operation may be described as follows: Assuming that strip 18 is in position extending across the type-wheel and engaged by the feed rolls 80 and 87, the parts being in the normal position shown in Fig. 6, and that type-wheel 14 has come to rest in position corresponding to the weight of an article being weighed, the handle 75 will be rotated clockwise, causing member 68 to be correspondingly rotated. The projection 68$^a$ will cause cam 66 to be rotated clockwise, thereby pushing rod 56 and operating arm 55 to cause the grippers 42 to engage and hold the type wheel, and during such time arm 31 will be depressed. When spring 32 has been carried down by arm 31 sufficiently far said spring will cause hammer arm 29 to be suddenly automatically depressed, whereupon the pad $c$ of the hammer will strike the paper strip 18 and cause printing of the numeral corresponding to the weight of the article and of the indicator $i^3$ upon the strip. During such period the projection 68$^c$ will ride upon the projection 71 and cause disengagement of projections 68$^a$ and 66$^b$, whereupon cam 66 will be released. Spring 40 will cause arm 31 and cam 66 to return to normal positions and just after the hammer rises from the strip 18 the rod 56 will cause the grippers to release the type-wheel. Since spring 76 will permit sliding movement of member 68 when projection 68$^a$ rides on projection 71 said spring will restore member 68, after said projections have been disengaged, into position to again engage projection 66$^b$ after completion of one rotation of member 75. After about one-quarter rotation has been given member 68 the continued rotation of operating member 75 will, through gears 77 and 78, cause rotation of sprocket 81 and thereby the feed rolls 80, 87 will be rotated to feed the printed portion of the strip in position to be torn off, and operating member 75 will be released, in a normal position ready for another corresponding operation, with projections 68$^a$ and 66$^b$ opposing for another operation.

Having now described the invention what is claimed is:

1. A recording scale comprising a type support, scale mechanism to operate said support, a hammer operative relatively to the support, a spring to actuate the hammer, and means to move the spring from one position to another relatively to the hammer, and vice versa, for causing operation of the hammer toward and from the type.

2. A recording scale comprising a type support, scale mechanism to operate said support, a hammer operative relatively to the support, a spring to actuate the hammer, means to manually move the spring in one direction to cause the hammer to strike for printing and to release the hammer, and spring means to return the spring and cause retreat of the hammer from the type.

3. A recording scale comprising a type support, scale mechanism to operate said support, a hammer operative relatively to the support, a spring to actuate the hammer, means pivotally supporting the hammer, operative means for the spring connected therewith, and means to manually operate the last named means to cause the spring to move from a position on one side of the pivoting means to the other side thereof to cause operation of the hammer.

4. A recording scale comprising a type support, scale mechanism to operate said support, a hammer operative relatively to the support, a spring to actuate the hammer, means pivotally supporting the hammer, operative means for the spring connected therewith, means to manually operate the last named means to cause the spring to move from a position on one side of the pivoting means to the other side thereof to cause operation of the hammer and release the spring, and spring means to cause return of the first named spring from the last named position to the first named position.

5. A recording scale comprising a type support, scale mechanism to operate said support, a hammer operative relatively to the support, a spring to actuate the hammer, an arm operatively connected with the spring, and means to rotate the arm from one position to another, and vice-versa, to cause movement of the spring relatively to the hammer for actuating the latter toward and from the type.

6. A recording scale comprising a type support, scale mechanism to operate said support, a hammer operative relatively to the support, a spring to actuate the hammer, an arm operatively connected with the spring, means to rotate the arm from one position to another, and vice-versa, to cause movement of the spring relatively to the hammer for actuating the latter toward and from the type, means to release the arm after the hammer has struck a blow, and means to automatically actuate the arm to cause the spring to return the hammer.

7. A recording scale comprising a type support, scale mechanism to operate said support, a hammer operative relatively to the support, a spring to actuate the hammer, an arm operatively connected with the spring, a projection connected with the arm, a member having a projection to cooperate with the first named projection and movable relatively thereto, means to rotate said member, and means to move said member and its projection relatively to the first named projection for releasing the latter.

8. A recording scale as set forth in claim 7 including spring means to actuate said arm when said projections are disengaged.

9. A recording scale comprising a type support, scale mechanism to operate said support, a hammer operative relatively to the support, a spring to actuate the hammer, an arm operatively connected with the spring, a projection connected with the arm, a member having a projection to cooperate with the first named projection and movable relatively thereto, and means to rotate said member, said member having a second projection and a cam-like projection cooperative therewith for causing movement of said members to release the first named projections.

10. A recording scale comprising a type support, scale mechanism to operate said support, a hammer operative relatively to the support, a spring to actuate the hammer, an arm operatively connected with the spring, a projection connected with the arm, a member having a projection to cooperate with the first named projection and movable relatively thereto, means to rotate said member, means to move said member and its projection relatively to the first named projection for releasing the latter, said member having a second projection and a cam-like projection cooperative therewith for causing movement of said members to release the first named projections, and spring means to actuate said arm when said projections are disengaged.

11. A recording scale comprising a type support, scale mechanism to operate said support, a hammer operative relatively to the support, a spring to actuate the hammer, an arm operatively connected with the spring, a projection connected with the arm, a member having a projection to cooperate with the first named projection and movable relatively thereto, means to rotate said member, means to move said member and its projection relatively to the first named projection for releasing the latter, said member having a second projection and a cam-like projection cooperative therewith for causing movement of said members to release the first named projections, spring means to actuate said arm when said projections are disengaged, said member being slidable, and a spring cooperating with said member to normally retain its projection.

12. A recording scale comprising a type support, a hammer, an arm pivotally supporting the hammer, a second arm pivotally supported, said arms having a common axis, a spring connected with said arms respectively on opposite sides of the pivots for normally retaining the arms in angular relation, and means to rock the second named arm to cause the spring to pass across the plane of the pivots.

13. A recording scale comprising a type support, a hammer, an arm pivotally supporting the hammer, a second arm pivotally supported, said arms having a common axis, a spring connected with said arms respectively on opposite sides of the pivots for normally retaining the arms in angular relation, means to rock the second named arm to cause the spring to pass across the plane of the pivots, means to release the second named arm when moved in one direction, and spring means to move said arm in the opposite direction.

14. A recording scale comprising a typewheel, scale mechanism to operate the typewheel, means to retain the type-wheel, a hammer, spring means to hold and actuate the hammer and manually controlled means to first actuate the retaining means to retain the type-shaft and next actuate the hammer including means to release the retaining means and the hammer after operation of the hammer and restore the said means and hammer after they are released from the manually controlled means.

15. A recording scale comprising a typewheel, scale mechanism to operate the typewheel, means to retain the type-wheel including a rod, a cam to actuate the rod, manually operative means to actuate the cam, means to cause the last named means to release the cam, a hammer, and spring means to operate the hammer, the hammer operating means being operatively connected with the cam for actuating the hammer.

16. A recording scale as set forth in claim 15 including a spring cooperative with the rod, and a sleeve cooperative with the spring and the cam.

17. A recording scale comprising a typewheel, scale mechanism to operate the typewheel, means to retain the type-wheel including a pair of grippers, a rod operatively connected with the grippers, a cam to actuate the rod, a hammer, spring means to actuate the hammer, means to manually operate the cam, and means operative by the cam to actuate the hammer.

18. A recording scale comprising a typewheel, scale mechanism to operate the typewheel, means to retain the type-wheel including a pair of grippers, a rod operatively connected with the grippers, a cam to actuate the rod, a hammer, spring means to actuate the hammer, means to manually operate the cam, means operative by the cam to actuate the hammer, said means comprising an arm connected with the cam, and an arm carrying the hammer, said spring means being connected with said arms.

19. A recording scale comprising a typewheel, scale mechanism to operate the typewheel, means to retain the type-wheel including a pair of grippers, a rod operatively connected with the grippers, a cam to actuate the rod, a hammer, spring means to actuate the hammer, means to manually operate the cam, means operative by the cam to actuate the hammer, said means comprising an arm connected with the cam, an arm carrying the hammer, said spring means being connected with said arms, a spring operative with the rod and cooperative with the cam, and a spring to operate the first named arm after release from the manually operative means.

20. A recording scale comprising a type support, a hammer, an arm carrying the hammer, means pivotally connecting the hammer and the arm, means to adjust the hammer relatively to the arm and retain them in set position, and means to operate the hammer toward and from the type support.

21. A recording scale as set forth in claim 20, in which the means for adjusting and retaining the hammer comprises a threaded rod pivotally connected with the hammer, and a nut on the rod cooperative with the arm.

22. A recording scale comprising a type support, scale mechanism to operate said support, a hammer operative relatively to the suport, a spring to actuate the hammer, means to move the spring from one position to another relatively to the hammer, and vice-versa, for causing operation of the hammer toward and from the type, means to support a strip to be printed, and means to feed the printed strip after the hammer has operated thereon.

23. A recording scale comprising a type support, scale mechanism to operate said support, a hammer operative relatively to the support, a spring to actuate the hammer, means to support a strip to be printed, feeding means for the strip, and means to operate the spring and the feeding means including gearing inoperative while the hammer is operating to print the strip and operative to feed the strip after the strip has been printed.

24. A recording scale comprising a type support, scale mechanism to operate said support, a hammer operative relatively to the support, a spring to actuate the hammer, means to support a strip to be printed, feeding means for the strip, a manually operative member for the spring, means to release said member from the spring during a partial rotation of said member, and gearing controlled by said member to actuate the feeding means including mutilated cooperative gears non-operative during said partial rotation of said member and operative during continued rotation of said member to cause operation of said feeding means.

ALBERT FRITJOF KARLSSON YGGER.